United States Patent [19]

Myrick

[11] 4,050,312
[45] Sept. 27, 1977

[54] GAUGE PROTECTOR SEAL

[76] Inventor: Alma Lillian Myrick, Rte. 8, Box 67, Texarkana, Ark. 75501

[21] Appl. No.: 667,762

[22] Filed: Mar. 19, 1976

[51] Int. Cl.² .......................... G01L 7/08; G01L 7/16
[52] U.S. Cl. ....................................... 73/395; 73/406; 73/419
[58] Field of Search .................. 73/395, 392, 406, 419

[56] References Cited

U.S. PATENT DOCUMENTS

| 996,358 | 6/1911 | Olsen | 73/419 |
| 1,224,786 | 5/1917 | Powers | 73/419 |
| 1,898,257 | 2/1933 | Nelson | 73/392 |

*Primary Examiner*—Donald O. Woodiel

[57] ABSTRACT

This invention provides a leak proof seal between a high pressure fluid line and a gauge monitoring the pressure of the fluid in the line. This seal transmits pressure fluctuations between the measured fluid and a dissimilar fluid in the standing line connected to the measuring gauge and prevents the comingling of the two fluids. This invention is particularly applicable in instances where the ambient temperature is below the freezing point of the measured fluid and a non-freezing fluid is required in the standing line and gauge. The gauge protector seal comprises an in-line elastomeric piston and cylinder which passes through variations in the pressure in the measured line to the fluid in the standing line to the gauge while maintaining separation of the two fluids and at the same time allowing the non-freezing fluid in the standing line to lubricate the piston.

3 Claims, 3 Drawing Figures

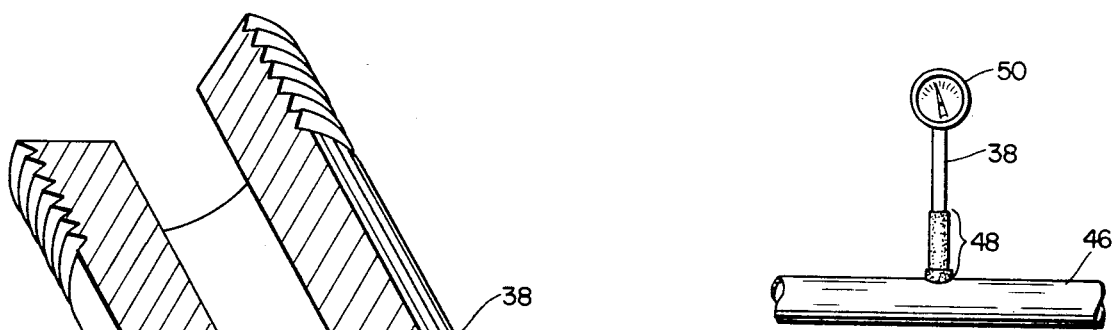
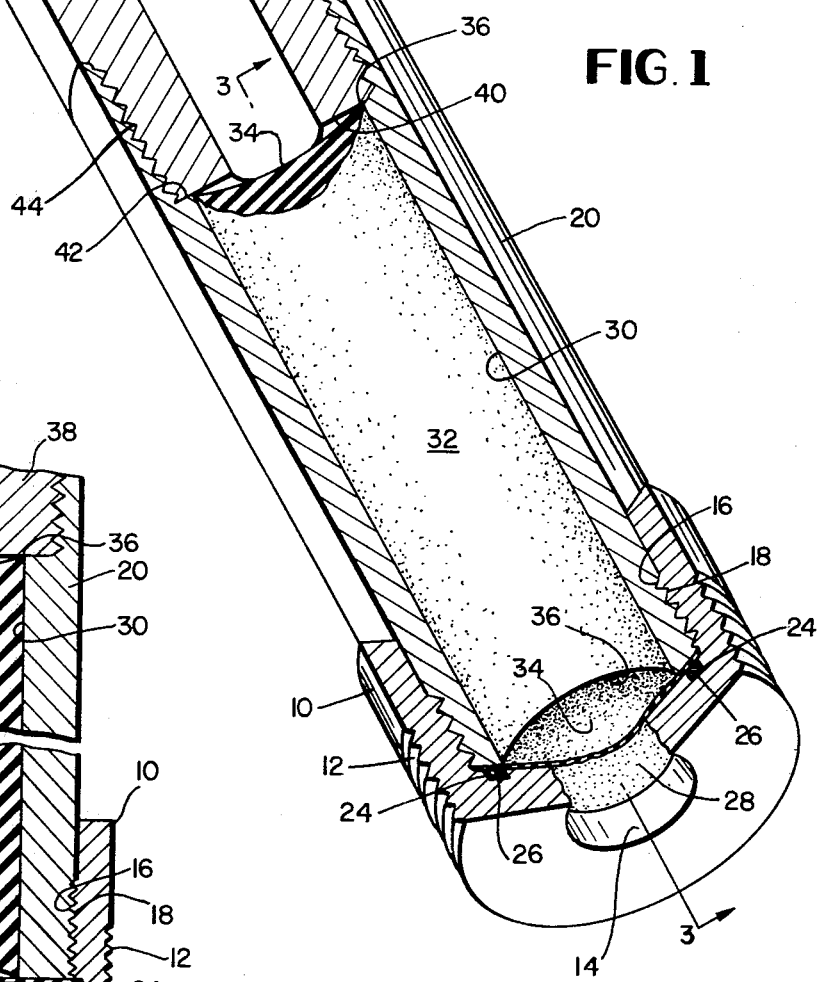
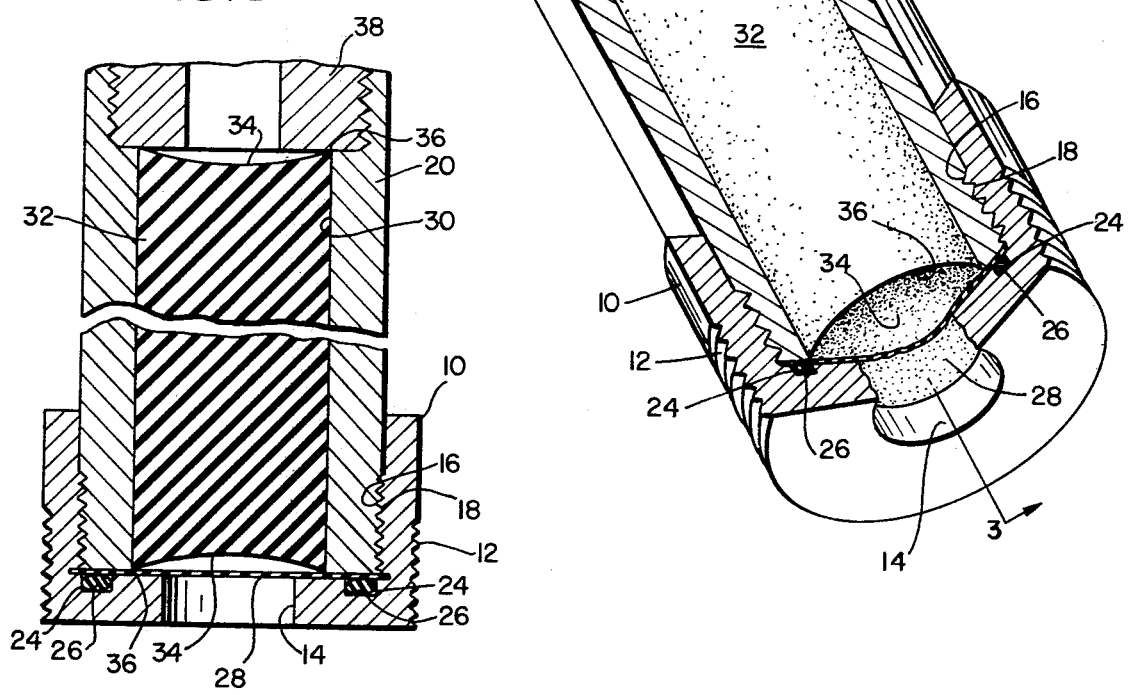
FIG. 2
FIG. 1
FIG. 3

GAUGE PROTECTOR SEAL

In the petroleum industry, both drilling operations and in refining, pressurized fluids must be monitored continuously and temperatures below the freezing point of the flowing fluids are often encountered. The moving fluids resist freezing, however, the standing fluid in the lines to the monitoring gauges and in the gauges themselves often freeze since the fluid is essentially stationary. Various methods are employed to counteract this freezing in the standing lines. Heat strips are wrapped around the lines and gauges, warm water is sprayed on the lines and gauges and other means are employed. Due to the high pressures involved, often running from 2000PSI to 5000PSI, no satisfactory seal has previously been found which could separate the measured fluid from a non-freezing fluid which could be used in the standing line and monitoring guage. The invention presented here eliminates these longstanding problems by providing a sealing piston which transmits the pressure variations of the measured fluid to a separate dissimilar fluid in the standing line and gauge which will not freeze at the temperatures encountered and will keep the two fluids separated.

A bushing is provided which secrews into the pipe line carrying the fluid to be monitored. This bushing is threaded on the inside to accomodate a piston cylinder and has a shoulder machined into the bottom and an O ring machined into the shoulder in the area contacted by the bottom end of the piston cylinder. An O ring is placed in the provided groove and a flexible membrane diaphragm is placed over this. The piston cylinder is fitted into the bushing and a tight fitting piston made from rubber or similar material with concave depressions on each end is installed. A thick walled pressure pipe with the end machined flat is screwed into the open end of the piston cylinder and provides a sealing surface against which the concave piston end may seat. The standing gauge pipe and gauge are filled with suitable non-freezing and lubricating fluid and sealed. The piston and diaphragm under pressure from the fluid to be monitored transmits the pressure to the fluid in the standing pipe and pressure gauge while sealing the two fluids at opposite ends of the piston. When there is no pressure in the monitored fluid pipe, the piston seals against the shoulder of the bushing preventing the fluid in the standpipe and gauge from leaking.

FIG. 1 is a cutaway view of the gauge protector seal illustrating the component parts and the method of construction.

FIG. 2 is an overall view of the gauge protector seal installed on a pipeline in its relationship with a monitoring pressure gauge.

FIG. 3 is a section view taken along lines 3—3 of FIG. 1.

Referring now to FIG. 1, a bushing 10 is machined of steel or similar suitable material with male threads 12 provided to be screwed into a flow pipe at the point where monitoring of the pressure is desired. The bushing is provided with a hole 14 which passes through the bushing 10. The interior of the bushing 10 is provided with female threads 16 which mate with male threads 18 on the piston sleve 20. The bushing 10 is provided with an interior shoulder 22 into which is machined or otherwise provided a groove 24 in the region contacted by the end of the piston cylinder 20 when the bushing 10 and sleve 20 are screwed together.

An O ring 26 made of neoprene or other suitable material is fitted in the groove 24 and a round flexible diaphragm 28 made from rubber, neoprene or other suitable flexible, impervious material is layed over the O ring.

The piston sleve 20 is made of steel or other suitable material of sufficient strength to withstand expected pressures and is machined on the inside 30 to the shape of a regular cylinder. The diameter of the machined cylinder 30 is made such that the piston 32 will seat against the flexible diaphragm 28.

The piston 32 is made from neoprene or other suitable material with an initial diameter slightly larger than the diameter of the machined piston cylinder 30 so that snug fit is obtained when the piston 32 is inserted in the cylinder 30. The piston 32 is provided with concave recesses 34 in each end which make the edges 36 of the ends of the piston thin and yielding under pressure.

A standpipe 38 or bushing comprises the opposite end of the cylinder 30 and is formed of a tube or pipe with thick walls or a shoulder 40 which abuts against a recess 42 in the sleve 20 at the end of the cylinder 30. The standpipe 38 or bushing is fitted to the sleve 20 by means of mating threads 44 in the two members.

The travel of the piston 32 within the cylinder 30 is limited to a short distance by the shoulders 22 and 40 on either end of the cylinder 30.

In operation, the gauge protector seal 48 (see FIG. 2) is screwed into a hole in a flow pipe 46. The standpipe 38 is filled with the desired fluid, the antifreeze solution commonly marketed as "Xerox Antifreeze" has been found to be satisfactory for many applications. The gauge 50 is attached to the standpipe 38 and the gauge 50 is also filled with the fluid through a bleed off valve or fitting commonly found on such gauges.

The fluid is forced into the gauge and standpipe which forces the piston 32 to seat against the diaphragm 28 and shoulder 22 on the bushing 10 and a very small quantity of this fluid finds its way between the piston 32 and cylinder wall 30. In some cases, it may be necessary to calibrate the gauge to "O" PSI with positive pressure in the gauge and standpipe from the fluid contained.

When drilling mud or other fluid passes through the flow pipe 46, the pressure in the flow pipe is transmitted through the diaphragm 28 and piston 32 to the fluid in the standpipe 38 and the gauge 50. Since fluids have a very limited compressability only slight movement of the piston 32 is required to transmit pressure fluctuations. When the piston 32 seats on the end 40 of the standpipe 38 or bushing the thin edges 36 of the piston 32 compress and seal while continuing to transmit higher pressures to the fluid in the standpipe 38 and gauge 50. When there is no pressure in the flow pipe 46, the piston 32 is forced down and seals against the diaphragm 28 and shoulder 22.

While the illustration presented is directed toward problems in the oil industry involving drilling mud and similar fluids and sub freezing temperatures it is recognized that a wide range of applications may be made of this device.

What is claimed is:

1. Apparatus for transferring pressure from a flow line having a first fluid therein to a standby line having one end in communication with said flow line, said standby line having a closed column of a second fluid and a pressure indicating means therein, said apparatus comprising a flexible piston of elastomeric material mounted for limited axial movement in daid standby line when subjected to pressure, said piston being disposed between said flow line and said indicating means and having curved concave ends which terminate in thin pointed piston edges, said standby line comprising a sleeve having said piston mounted therein, and means for limiting the axial movement of said piston in said sleeve to a short distance, the normal diameter of said piston being slightly in excess of the inside diameter of said sleeve, and flexible means for sealing the junction between said flow line and said standby line, said sealing means being disposed between said flow line and said piston, whereby pressure in said flow line is transferred to said sealing means to effect limited movement of said piston and to subject said second fluid and said fluid indicating means to said pressure.

2. The apparatus of claim 1 wherein said second fluid is a non-freezing fluid.

3. The apparatus of claim 1 wherein said sealing means is a flexible membrane impervious to said first and second fluids.

* * * * *